(12) United States Patent
Garceau

(10) Patent No.: US 6,659,303 B2
(45) Date of Patent: Dec. 9, 2003

(54) TANK FOR STORING GAS AT HIGH PRESSURE

(75) Inventor: Patrick Garceau, St.Pierre d'Autils (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 09/738,261

(22) Filed: Dec. 15, 2000

(65) Prior Publication Data

US 2001/0004902 A1 Jun. 28, 2001

(30) Foreign Application Priority Data

Dec. 17, 1999 (FR) .............................. 99 15957

(51) Int. Cl.⁷ ............................................. F17C 1/00
(52) U.S. Cl. ............ 220/566; 220/560.11; 220/DIG. 13
(58) Field of Search ................. 137/561 R; 220/560.04, 220/560.11, 566, 581, 901, DIG. 13

(56) References Cited

U.S. PATENT DOCUMENTS

| | | | | | |
|---|---|---|---|---|---|
| 1,645,944 A | * | 10/1927 | Debor | ......................... | 220/581 |
| 2,250,250 A | * | 7/1941 | Brooks | .................... | 220/566 X |
| 2,451,486 A | * | 10/1948 | Horton | .................... | 220/581 X |
| 3,252,610 A | * | 5/1966 | Greenlee | .................... | 220/585 |
| 3,409,061 A | * | 11/1968 | Struble, Jr. | .............. | 220/901 X |
| 3,432,060 A | * | 3/1969 | Cowley | .................... | 220/591 |
| 3,472,414 A | * | 10/1969 | Rodrigues | .................... | 220/581 |
| 3,505,996 A | * | 4/1970 | Cowley | .................... | 220/581 |
| 4,561,476 A | * | 12/1985 | Bunkoczy | ............... | 220/566 X |
| 4,576,015 A | | 3/1986 | Crawford | ................ | 220/581 X |

FOREIGN PATENT DOCUMENTS

| | | |
|---|---|---|
| DE | 23 05 840 A | 8/1974 |
| FR | 2 739 912 A | 4/1997 |
| WO | WO 99 19203 A | 4/1999 |

* cited by examiner

*Primary Examiner*—John Rivell
(74) *Attorney, Agent, or Firm*—Weingarten, Schurgin, Gagnebin & Lebovici LLP

(57) ABSTRACT

The tank for storing gas at high pressure, such as a tank for a vehicle running on gas, comprises a confinement volume accessible via coupling means and defined by a duct disposed in a spiral coil so that the substantially rectilinear main portions of the duct bear against one another. The forces exerted by the pressure of the gas on the main portions of a turn of the duct are then compensated by the forces exerted on the adjacent turns of the duct.

9 Claims, 6 Drawing Sheets

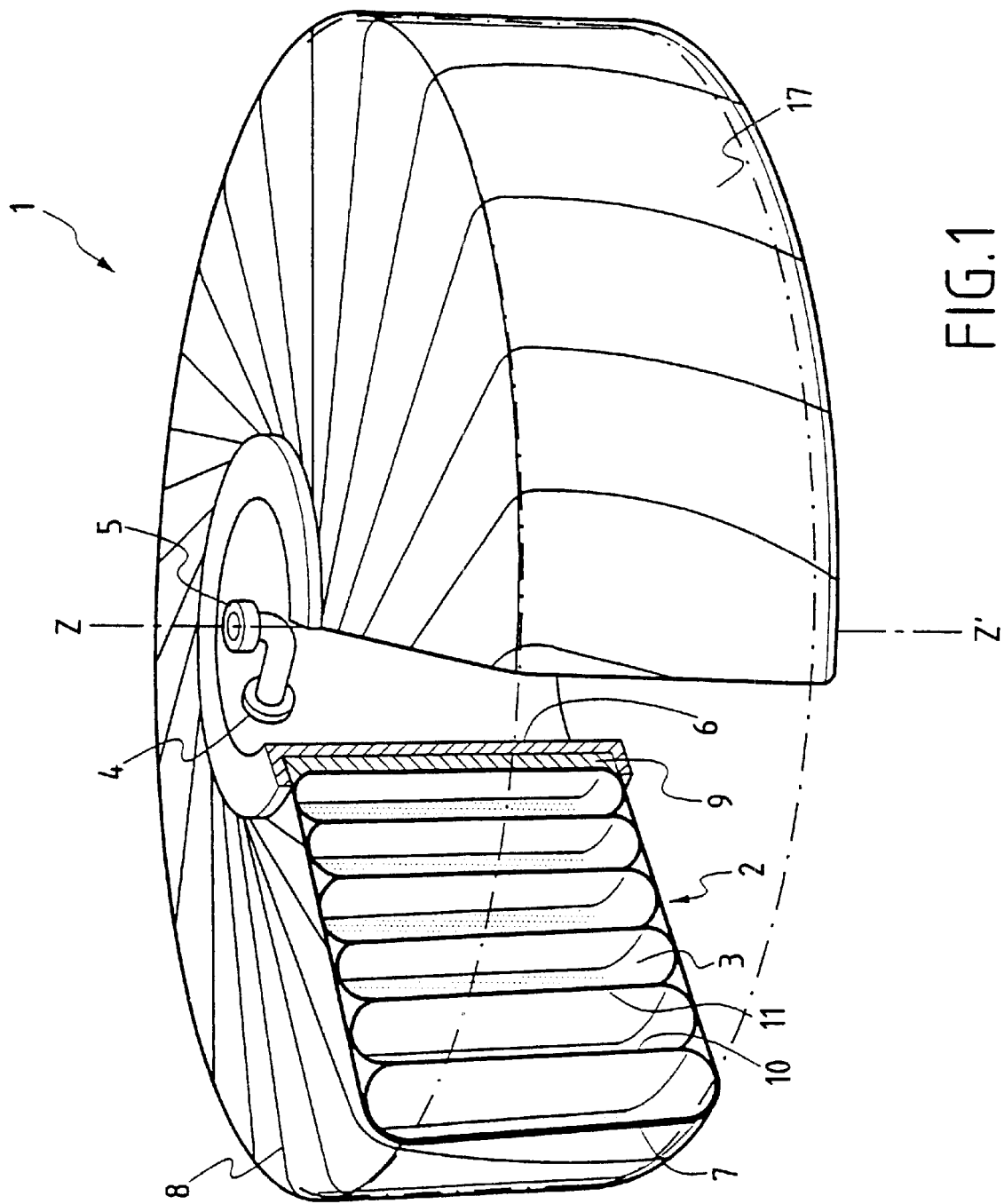

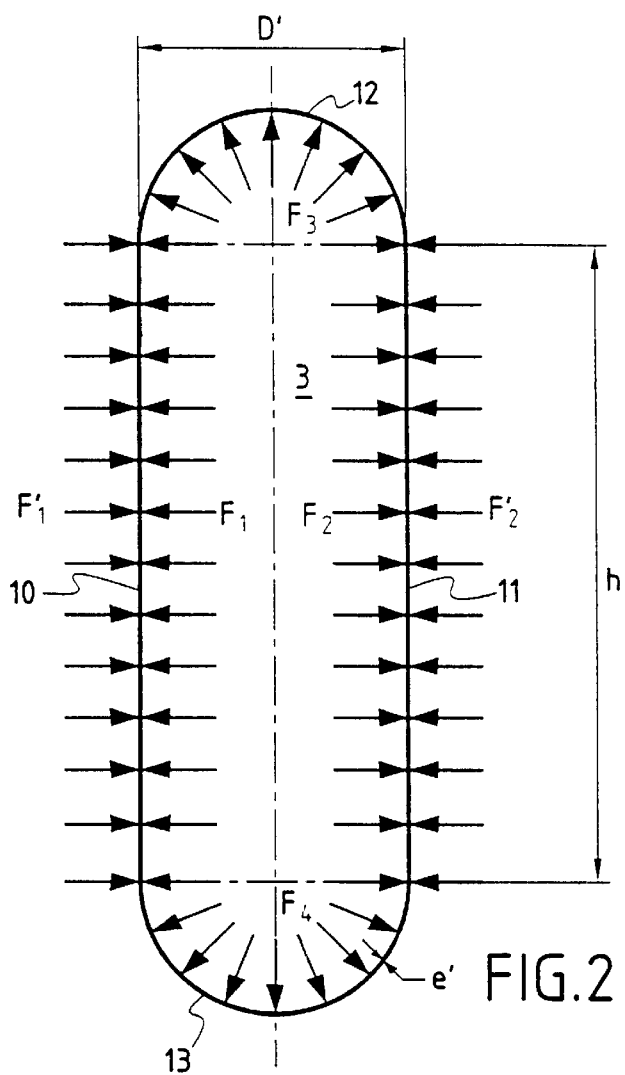
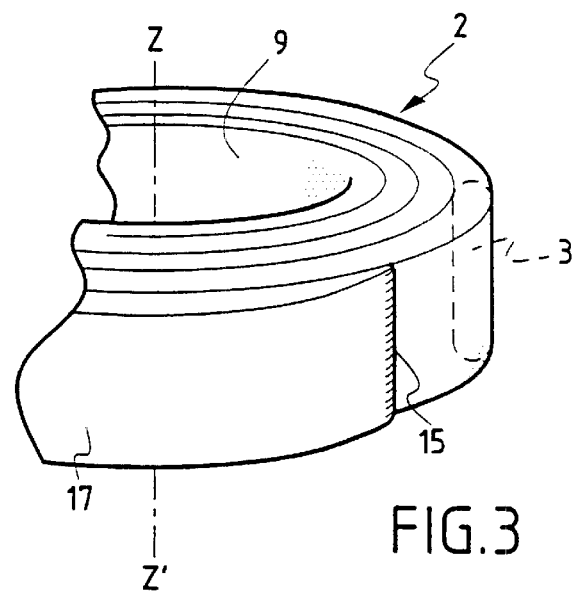

TANK FOR STORING GAS AT HIGH PRESSURE

FIELD OF THE INVENTION

The present invention relates to a tank for storing gas at high pressure, the tank comprising a confinement volume in selective communication with the outside via coupling means. More particularly, the invention relates to tanks that are lightweight and compact for storing gas at high pressure in applications to non-polluting terrestrial vehicles (LNG, H2, LPG, . . . ) or indeed to aircraft or spacecraft.

Prior Art

Conventional tanks for storing gas at high pressure are known generally to be in the form of cylinders or spheres. Those types of tank used singly or on a rack, occupy a large amount of volume because of their shape and because of the presence of projecting means for coupling and for providing the protection required by regulations (against impact, fire, . . . ). Combining cylinders does indeed serve to reduce one of the dimensions used for storage, for example the height dimension, but it inevitably gives rise to storage assemblies that are heavy and expensive, and that are larger in size with respect to their other dimensions. In the best known prior art configurations, the volume dedicated to storing gas does not exceed 40% of the overall volume for a maximum structural ratio of 1.5 liters per kilogram (1/kg).

OBJECT AND BRIEF DESCRIPTION OF THE INVENTION

The present invention seeks to remedy the above-mentioned drawbacks of the prior art, and in particular to provide a tank for storing gas at high pressure which presents reduced size and mass when storing a volume equivalent to that of a conventional tank, while nevertheless complying with the protection conditions required in the prior art.

These objects are achieved by a tank for storing gas at high pressure, the tank comprising a confinement volume in selective communication with the outside via coupling means, wherein said confinement volume comprises a duct of oblong section formed by elongate first and second portions interconnected by curvilinear third and fourth portions, and wherein said duct is disposed as a plurality of touching segments so as to enable at least one of the elongate portions of one touching segment to bear against a corresponding one of the elongate portions of an adjacent touching segment in said plurality of touching segments.

The invention thus proposes a tank for storing gas at high pressure which enables mass and bulk to be reduced significantly compared with prior art tanks for given storage volume. Furthermore, the tank of the invention is of a design which not only optimizes the tank in terms of mass and bulk, but also guarantees that it complies with the safety requirements for this type of storage.

The duct may have a section of varying dimensions.

In particular embodiments, the third and fourth curvilinear portions are semicircles.

More specifically, the elongate portions are substantially rectilinear.

In an embodiment of the invention, the duct is disposed as a spiral coil about an axis ZZ' from an inner end of said duct having the coupling means to a closed outer end finishing off said duct.

In this way, the coupling means of a tank no longer project therefrom, thus reducing the overall size thereof.

The tank may be in the form of a wheel, it may be oval in shape, or indeed it may be rectangular in shape.

According to a particular feature of the invention, the said tank defines front walls that are substantially plane and parallel.

Alternatively, the tank defines at least one front wall that is substantially frustoconical.

According to a particular characteristic of the invention, an inner surface of the tank defined by the coiled duct includes an internal hoop.

The innermost turn of the coil whose inside face cannot benefit from an adjacent turn compensating the force exerted by the gas pressure is thus reinforced on the inside.

According to another characteristic of the invention, an outer surface of the tank defined by the coiled duct includes an outer hoop.

The outermost turn of the coil whose outside face cannot benefit from an adjacent turn compensating the force exerted by the gas pressure is thus reinforced on the outside.

The design of a tank of the invention can also be optimized by being disposed as a coil of helical type.

Thus, in an embodiment of the invention, the duct is disposed as a helical coil about an axis ZZ' starting from a closed first end and extending to a second end having the coupling means.

The design of a tank of the invention can also be optimized by disposing the duct in a zigzag configuration serving in particular to make a tank in the form of a rectangular parallelepiped.

Thus, in another embodiment of the invention, the duct is disposed in a zigzag configuration from a first end having the coupling means to a second end which can be closed or which can likewise have coupling means.

According to a particular feature, the tank has bends in which at least one bead of welding is formed.

The tank may also comprise a winding surrounding the sides of the zigzag formed by the duct.

The present invention also provides a method of manufacturing a tank for storing gas at high pressure, the method comprising the following steps: curving a duct of oblong section into a plurality of touching segments so as to enable at least one elongate portion of a touching segment of said duct to bear against an elongate portion of an adjacent touching segment; heat-treating said duct while it is temporarily banded; and winding a carbon or glass fiber over the outside surface of the duct.

The invention thus provides a method of manufacturing a tank which makes it possible to obtain a tank that is at least as reliable in terms of safety as tanks known in the prior art and which provides significant savings in mass and bulk.

According to a feature of the invention, the method further comprises a step of closing a first end of said duct and a step of fixing communication means to a second end of said duct.

According to a particular characteristic, the method comprises a step of forming said duct of oblong section by means of a metal strip that is closed by axial welding.

According to another feature of the invention, the operation of curving the duct further comprises applying pressure inside said duct and/or preheating said duct.

In an implementation of the invention, the curving step corresponds to coiling the duct about an axis ZZ', and the method further comprises a step of inserting an inside hoop against the inner surface defined by said coil.

In another implementation of the invention, the curving step corresponds to folding the duct into a zigzag configuration, and the method also comprises a step of welding the bends of the duct in the zigzag configuration.

Specifically, the method of the invention further comprises a step of tightening the external winding.

Advantageously, the method further comprises a step of wrapping the tank in glass fiber winding.

BRIEF DESCRIPTION OF THE DRAWINGS

Other characteristics and advantages of the invention appear from the following description of particular embodiments of the invention, given as non-limiting examples and with reference to the accompanying drawings, in which:

FIG. 1 is a partially cutaway perspective view of a tank constituting a first embodiment of the present invention;

FIG. 2 is a section view of one turn of a tank, showing the section of a duct of the invention;

FIG. 3 is a fragmentary perspective view showing one end of a coil of the FIG. 1 tank;

DETAILED DESCRIPTION OF PARTICULAR EMBODIMENTS

Figure 4:
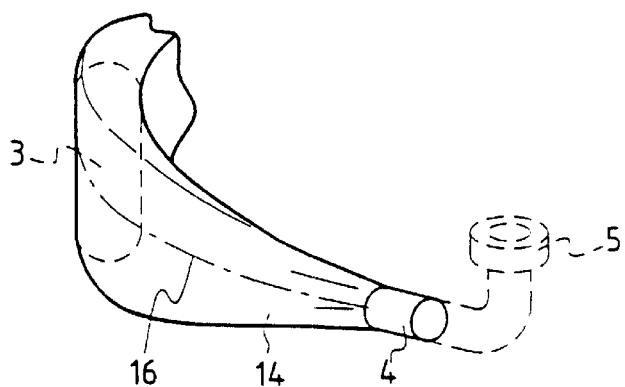
FIG. 4 is a fragmentary perspective view showing another end of a coil of the FIG. 1 tank.

FIG. 1 shows a tank 1 for storing gas at high pressure, and in a first embodiment of the invention this tank comprises a gas confinement volume 2 constituted by a spiral coil of a metal duct 3 about an axis ZZ'. The duct 3 has a section that is flat or oblong in shape and it is coiled as a plurality of adjacent turns to enable the turns to bear against one another via their substantially rectilinear elongate portions 10, 11 with the exception of the innermost turn and of the outermost turn each of which has only one of its rectilinear portions bearing against an adjacent turn.

Coiling a duct of flat section so that its turns touch enables the objects of the invention to be achieved, specifically it enables mass, bulk, and cost of the tank to be reduced compared with a conventional tank for storing the same quantity of gas.

FIG. 2 is a section through the duct 3 showing two rectilinear elongate portions 10, 11 interconnected by curvilinear portions 12, 13. The forces exerted by the gas pressure on the elongate portions 10, 11 are represented by respective series of arrows $F_1$ and $F_2$ in a force-cancellation zone h. The forces exerted on the outside walls of the duct by the adjacent turns are represented by series of $F_1'$ and $F_2'$ in the zone h. It can be seen that the radial forces $F_1$, $F_2$ exerted by the gas pressure inside the duct on the respective rectilinear portions 10 and 11 are compensated respectively by radial forces $F_1'$ and $F_2'$ exerted on the corresponding portions of adjacent turns. Thus, it can be considered that the gas pressure forces stress only the curvilinear portions 12, 13 which are subjected respectively to axial forces $F_3$ and $F_4$. The thickness of the duct wall can be reduced in proportion to the amount of compensation. Mechanically dimensioning the duct 3 to match the pressure thus amounts to dimensioning a tube of diameter D' as constituted by combining the two curvilinear portions 12 and 13. In some cases, depending on the material from which the duct is made and the pressure at which the gas is to be stored, the wall thickness of the duct can be greater in the curvilinear portions 12, 13 than in the rectilinear portions 10, 11.

Figure 10:
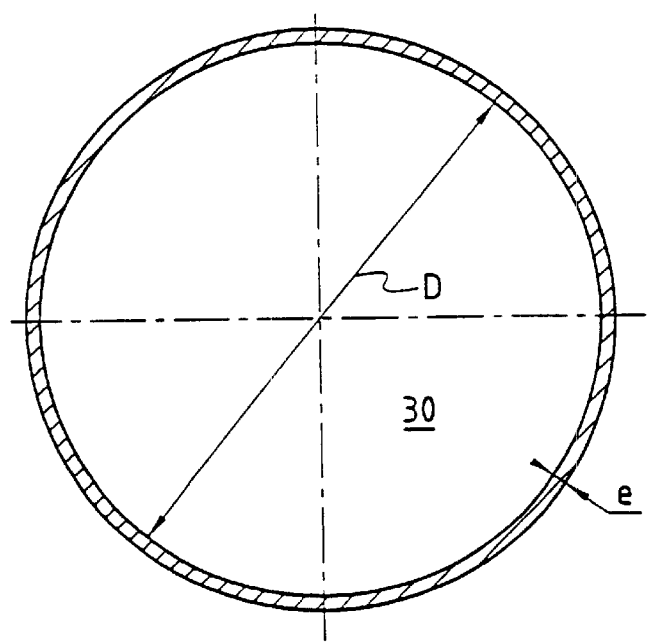
FIG. 10 is a section view showing the section of a tube.

FIG. 10 shows a section of a tube 30 for containing gas at a given pressure. This section has a diameter D and a wall thickness e. The relationship between the diameter D and the thickness e of the tube for a given material and a given gas pressure is of the type e/D=constant. Consequently, if the diameter D of the section can be reduced, then the relationship e/D=constant makes it possible to deduce that the thickness e can likewise be reduced in proportion. Consequently, by way of example, reducing the diameter by half, D'=D/2, makes it possible to reduce the wall thickness of the tank by an equivalent amount e'=e/2. A duct in accordance with the invention can be shaped specifically by flattening a tube 30 of diameter D so that it ends up presenting an oblong shape as shown in FIG. 2 with two curvilinear portions 12, 13 of diameter D'=D/2, thus making it possible to have a wall thickness e'=e/2 while satisfying the same pressure requirements as the tube 30.

In any event, the saving in mass per unit length is 50%. Nevertheless, it should be observed that the deformed section of the duct 3 is smaller than that of the original tube 30. In the above example, the tube needs to be lengthened by 33% in order to contain the same volume. The actual saving in mass thus amounts to 33% overall and raises the structural ratio of a tank of the invention to better than 1.5 l/kg.

The method of manufacture and the tank of the invention are described below with reference to a first embodiment shown in FIGS. 1 to 4. The oblong section duct 3 can be obtained either at low cost by folding and welding a metal strip, or else by drawing a seamless tube, i.e. without any welds. One end 16 of the duct 3 as obtained in this way is shaped by metal working to have a cylindro-conical funnel shape 14 as shown in FIG. 4 serving to receive a coupling element 4 and a communication element 5. The communication element 5 may comprise a valve, a piston, or any element enabling the tank to be selectively opened and closed for filling and delivery purposes. FIG. 3 shows the other end 15 of the duct 3 which is likewise shaped so as to taper progressively down to a tip which is closed by welding.

The next operation consists in curving the duct 3 into a spiral coil beginning with the end 16 and ending with the opposite end 15. This curving operation can be performed on a numerically controlled machine and, depending on the characteristics of the profile of the duct 3, it can be done either by applying a determined pressure to the inside of the duct 3, or by preheating it, or indeed by a combination of the two. The coil blank is then temporarily banded and subject to an appropriate heat-treatment cycle. The spiral coil of the duct 3 then becomes fixed in its final shape and needs to be reinforced at its outside surface 17 so as to conserve the coherence and reliability of the coil structure once the duct is under pressure. The turns of the duct 3 that bear against one another after the coiling operation may optionally have material interposed between them so as to reduce the friction forces between two rectilinear elongate portions 10, 11 or 11, 10 of two adjacent turns.

The outer cylindrical surface 17 defined by the outermost turn of the coil is banded by winding carbon fiber or glass fiber to form an external hoop 7 surrounding the coil. Then an internal hoop 6 is put into place against the inside surface 9 of the coil. The internal hoop 6 comprises a metal ring potted in an epoxy type resin. An optional glass fiber protective wrapping 8 can be wound over the entire ring formed by the coil to protect it against impact and chemicals.

After the composite has been cured, the assembly is subjected to a tightening operation for putting the outer hoop 7 under tension and the metal duct 3 under compression in the absence of any gas pressure. Finally, a hydraulic test type operation is performed in compliance with the regulations in force depending on the intended use of the tank.

The tank 1 as obtained in this way can for example present a storage capacity of 100 liters by using a coil having 7.5 turns with an outside diameter of 950 mm and an outside height of 190 mm.

Numerous variant embodiments are possible. For example, the outer hoop 7 could be made using a metal material.

The tank shown in FIG. 1 is wheel-shaped. This shape makes the tank very suitable for integrating in structures such as small or large motor vehicles, which require the bulk and the mass of this type of component to be optimized.

Nevertheless, a wide variety of tank shapes can be obtained while maintaining the optimized design properties of a tank of the invention (touching turns of a tube of flat section).

Figure 5:
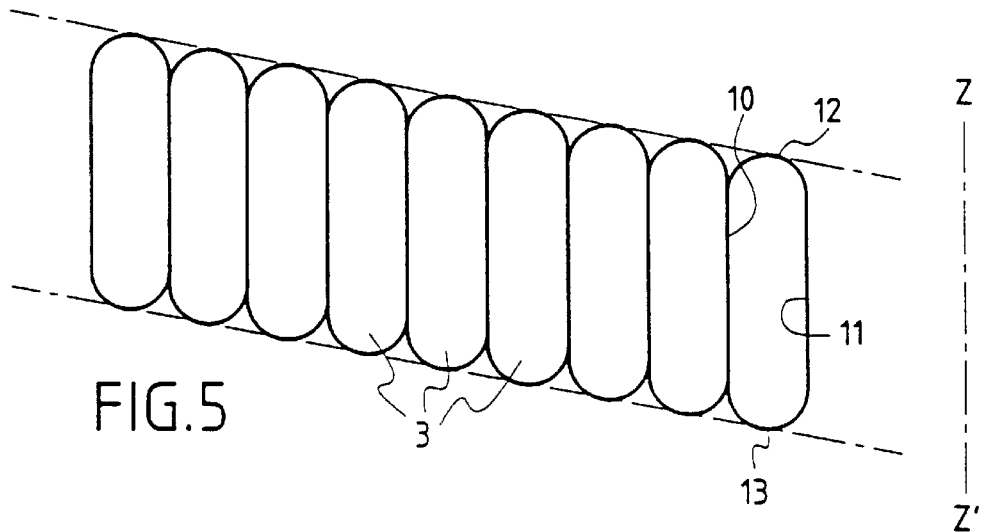
FIG. 5 is an axial half-section view showing a disposition of turns of a duct of constant section in accordance with the invention.
Figure 6:
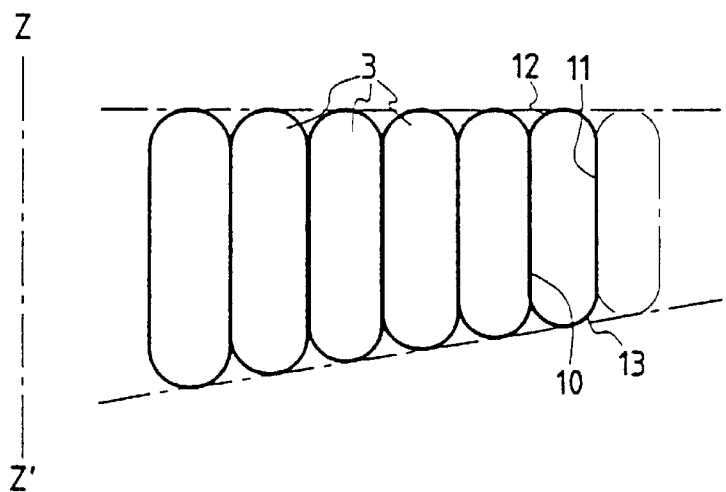
FIG. 6 is an axial half-section view showing a disposition of turns of a duct of varying section, in accordance with the invention.

By way of example, FIGS. 5 and 6 show that by having a duct 3 of section that is slightly asymmetrical, it is possible to vary the shape of the envelope occupied by the tank. FIG. 5 is a section view showing a tank of a shape in which a duct of constant section is offset vertically from one turn to the next going away from the center of the coil. FIG. 6 is a section view showing the shape of a tank whose bottom surface likewise rises going outwards but whose top surface remains flat because its duct 3 is of varying section. With such shape characteristics, the tank then has one or two front walls that are substantially frustoconical instead of being substantially plane and parallel as is the case for configurations of ducts that are of fixed dimensions and without asymmetry. These two variant shapes present additional advantages for fitting or for use, in particular they provide the option of having a low point in the tank in the vicinity of which the coupling and communication means 4, 5 can be fitted.

Figure 7:
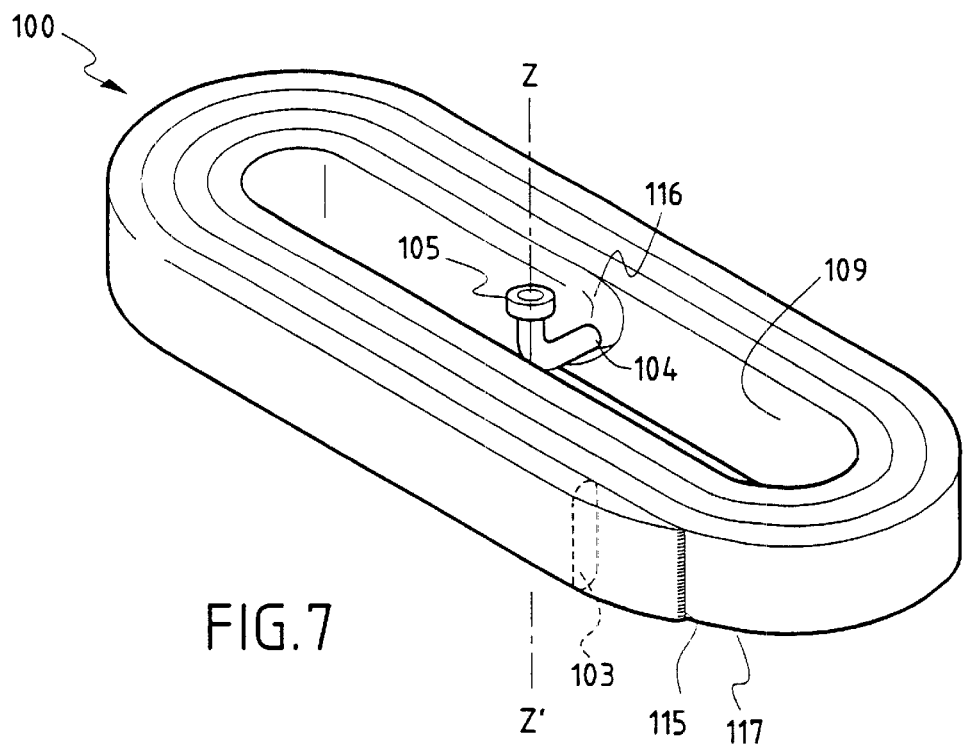
FIG. 7 is a perspective view of a tank constituting a second embodiment of the invention.
Figure 8:
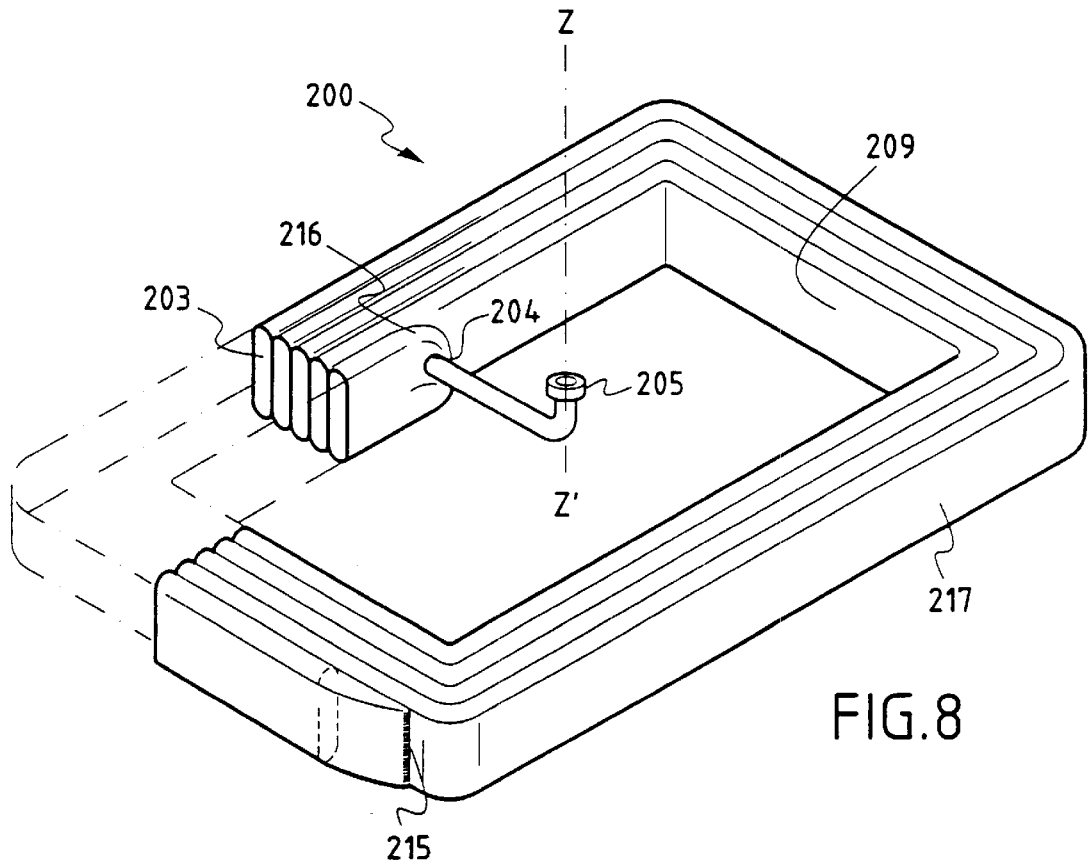
FIG. 8 is a perspective view of a tank constituting a third embodiment of the invention.
Figure 9:
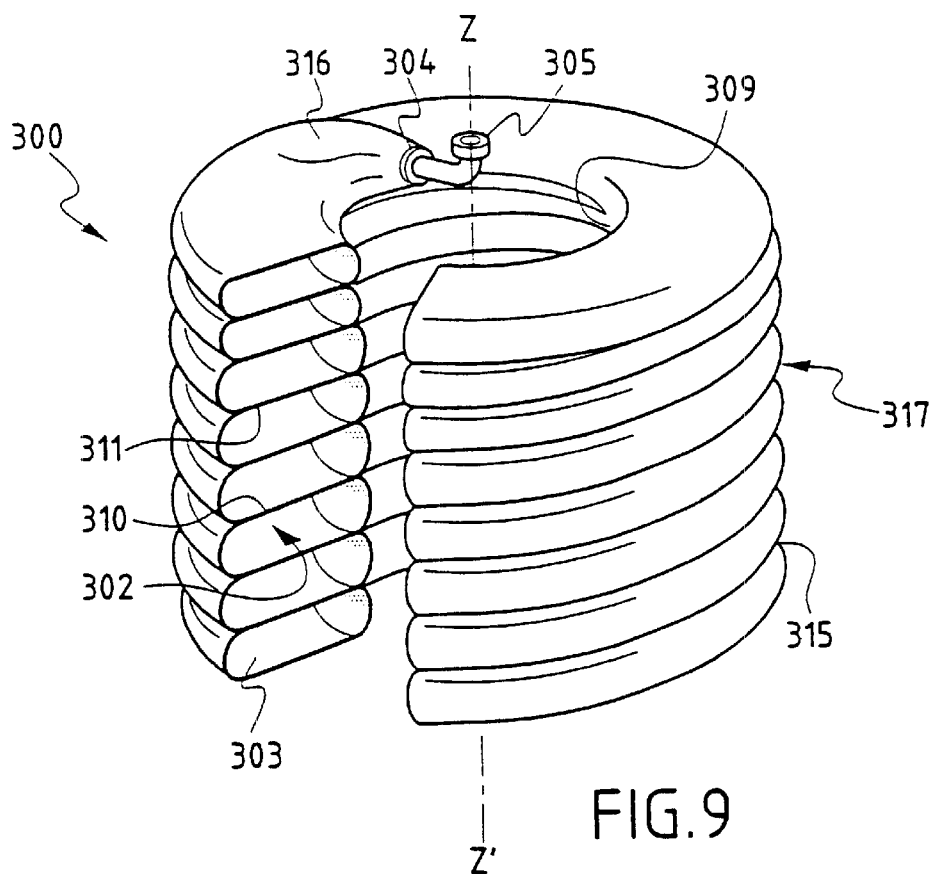
FIG. 9 is a partially cutaway perspective view of a tank constituting a fourth embodiment of the present invention.

As other examples of variant shapes for a tank of the invention, FIGS. 7, 8, and 9 show respectively a second embodiment 100, a third embodiment 200, and a fourth embodiment 300 of the invention. These variant shapes comprise two variant spiral coils, and a coil that is of the helical type. It will be observed that all of the elements of the second, third, and fourth embodiments referenced in FIGS. 7, 8, and 9 are equivalent in shape and function to elements of the first embodiment of the tank 1 of the invention and are therefore not described in detail. In addition, FIGS. 7, 8, and 9 show the second, third, and fourth embodiments of the invention stripped of its covering, i.e. without the wound hoops and wrappings described with reference to FIG. 1. The person skilled in the art will readily understand that those embodiments can be made to include these elements by implementing the manufacturing method described above.

In all of these embodiments, the coupling element 4 and the communication element 5 are disposed inside the internal cylindrical volume defined by the inside surface 9 of the coil. Although this is not the only disposition, it avoids any need to have coupling means projecting from the tank. FIG. 7 shows a tank 100 shaped as a spiral coil using the manufacturing method described above with reference to FIG. 1, but presenting a final shape that is oval which is obtained by appropriate adjustments during the curving of the duct. Similarly, by using different curving parameters and optionally by redimensioning the duct, a tank 200 of the invention can present the shape of an elongate rectangle as shown in FIG. 8.

FIG. 9 shows a fourth embodiment of tank 300 of the invention which differs from the preceding embodiments not only in its shape but also in the way the duct is coiled about the axis ZZ'. In the embodiments described with reference to FIGS. 1, 7, and 8, the duct is coiled as a spiral around the axis ZZ' with the elongate portions 10, 11 of adjacent turns extending parallel to the axis ZZ'. This has the effect of coiling the duct around itself and it is the number of turns in the coil that defines the diameter or transverse size of the resulting tank. In different manner, the tank 300 shown in FIG. 9 comprises a duct 303 that is likewise oblong in section, but that is coiled around the axis ZZ' in a helical disposition. In this structural configuration, the coiling of the turns begins at one end 315, e.g. the end that tapers down to a welded tip, and it is coiled upwards about the axis ZZ' to its other end 316 which is fitted with the coupling and communication means 304, 305. In this embodiment, the set of juxtaposed turns serves to define the longitudinal dimension of the tank along the axis ZZ'.

Figure 11:
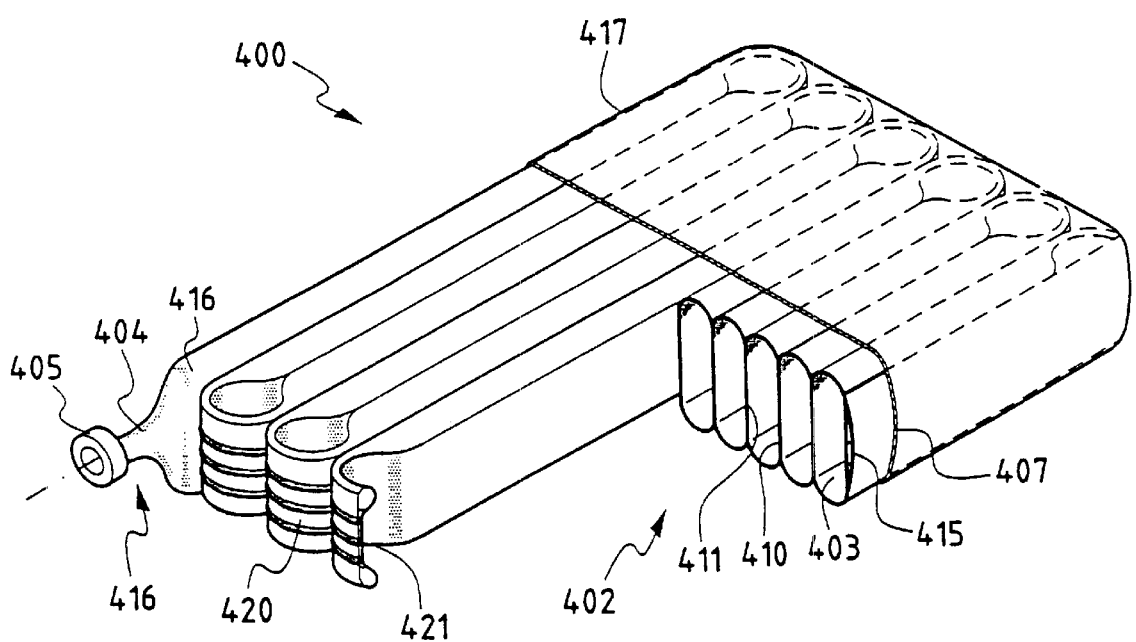
FIG. 11 is a partially cutaway perspective view of a tank constituting a fifth embodiment of the present invention.

A fifth embodiment of a tank of the invention is shown in FIG. 11. In this embodiment, the tank 400 is made by folding a duct 403 into a plurality of touching segments in a zigzag configuration with bends 420. This disposition of the single duct 403 enables the effects desired for the invention to be obtained. The elongate portions 410, 411 of touching segments do indeed bear against corresponding elongate portions of adjacent touching segments of the duct with the exception of the end lengths 416, 415 which can respectively include either the coupling means 404, 405 at one end and a tapering duct closure shape at the other end, or else coupling means at both ends. The end 415 is shown in this case as having a compensating end profile in the form of a half-bend with internal reinforcement. A winding 407 over the entire side surface of the tank 400 is provided to prevent the touching zigzag-folded segments from moving under the effect of gas pressure. Each bend 420 can be shaped and reinforced by one or more beads of welding 421 over the entire inner or outer periphery of the bend. This makes it possible firstly to obtain a short bend through 180° for the duct 403 while retaining head loss inside the tank that is compatible with fast filling, and secondly makes it possible to control deformation under pressure, in particular because of the presence of the beads of welding 421.

Naturally, all of the embodiments described above can be combined with a special disposition of the duct (asymmetry) or with varying size of its section, as explained with reference to the first-described embodiment. The shapes of tank thus obtained are a function of the way in which the selected duct of the invention is disposed and of the parameters governing the disposition and the dimensions of the duct. The person skilled in the art will have little difficulty in imagining any shape for implementing tanks of the invention.

The fifth embodiment shown in FIG. 11 serves in particular to obtain tanks in the form of compact rectangular parallelepipeds without any empty space in the center of the tank.

Tanks of the invention are well suited to storing gas at pressures that can be of the order of 200 bars, for example, or even higher. Such tanks can be of reduced mass, particularly if they are made of a material such as aluminum.

When a tank of the invention is integrated in a vehicle, it will be observed that from the safety point of view, because of its shape that implements pseudo-partitioning, the effects of a sudden loss of pressure, e.g. due to an impact, are moderated by the inertia of the stored mass. In particular, it should be observed that the tank has considerable capacity for absorbing impact in a plane that contains the large dimension of the tank (plane perpendicular to the axis ZZ' in the embodiments of FIGS. 1, 7, and 8, an axial plane containing the axis ZZ' for the embodiment of FIG. 9, and the lateral plane for the embodiment of FIG. 11), with the tank then presenting itself in the form of an elastic "sandwich" structure placed in a vehicle in such a manner as to be suitable for absorbing the kind of impact that is most frequent in this type of use, i.e. lateral impacts.

What is claimed is:

1. A tank for storing gas at high pressure, the tank comprising:

a duct of oblong cross section wound about a central axis to form a planar coil in which respective elongated sides of adjacent coil segments are touching, the duct further including curvilinear end portions interconnected by the elongated sides and having thickness substantially less than the thickness required for a duct of similar material and storage capacity but circular cross section, the curvilinear portions lying along respective planar sides of the tank; and inner and outer reinforcing hoops operative to counteract generally radial forces generated by the high-pressure gas, the inner hoop being held in compression by an inner elongated portion of an innermost one of the coil segments, and the outer hoop being held in tension by an outer elongated portion of an outermost one of the coil segments.

2. A tank according to claim 1, wherein the duct has a section of varying dimensions.

3. A tank according to claim 1, wherein the duct is disposed as a spiral coil about an axis ZZ' from an inner end of said duct having the coupling means to a closed outer end finishing off said duct.

4. A tank according to claim 1, wherein the tank is wheel-shaped.

5. A tank according to claim 1, wherein said tank defines front walls that are substantially plane and parallel.

6. A tank according to claim 1, wherein an inner surface of the tank defined by the coiled duct includes an internal hoop.

7. A tank according to claim 1, wherein an outer surface of the tank defined by the coiled duct includes an outer hoop.

8. A tank according to claim 1, wherein the curvilinear third and fourth portions are semicircles.

9. A tank according to claim 1, wherein said elongate portions are substantially rectilinear.

* * * * *